Feb. 25, 1930.  E. WILDHABER  1,748,813
SPIRAL BEVEL GEAR
Filed Jan. 25, 1924   3 Sheets-Sheet 2
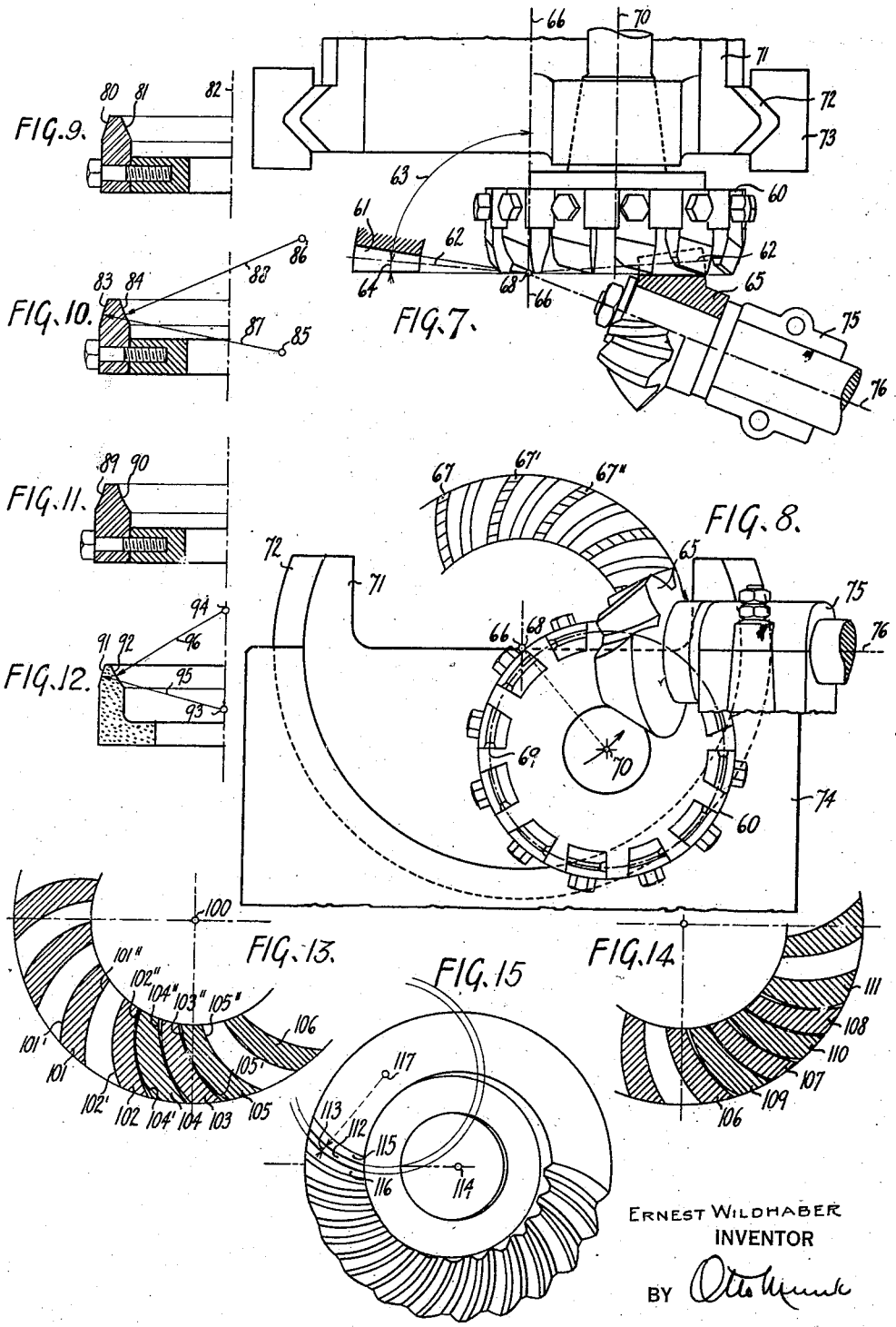
ERNEST WILDHABER
INVENTOR
BY *Otto Munk*
his ATTORNEY Feb. 25, 1930. E. WILDHABER 1,748,813
SPIRAL BEVEL GEAR
Filed Jan. 25, 1924   3 Sheets-Sheet 3
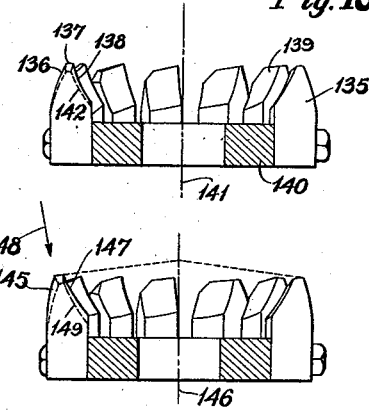
Fig.16
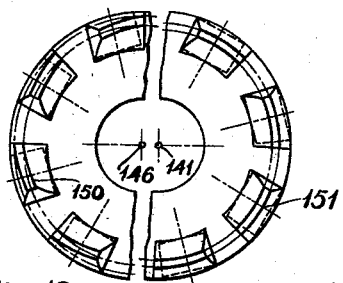
Fig.19   Fig.18
Fig.17
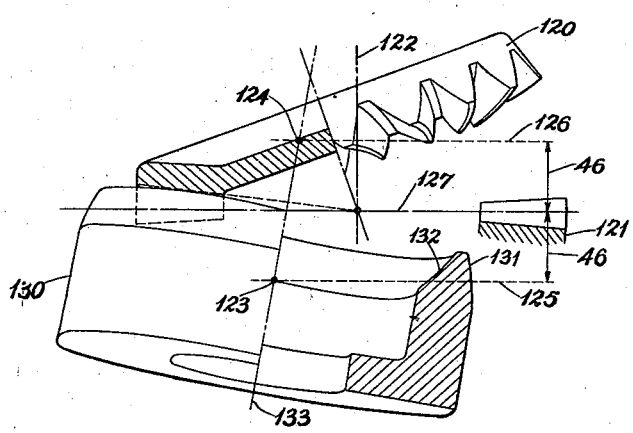
Fig.6
INVENTOR
E. Wildhaber
BY
ATTORNEY Patented Feb. 25, 1930

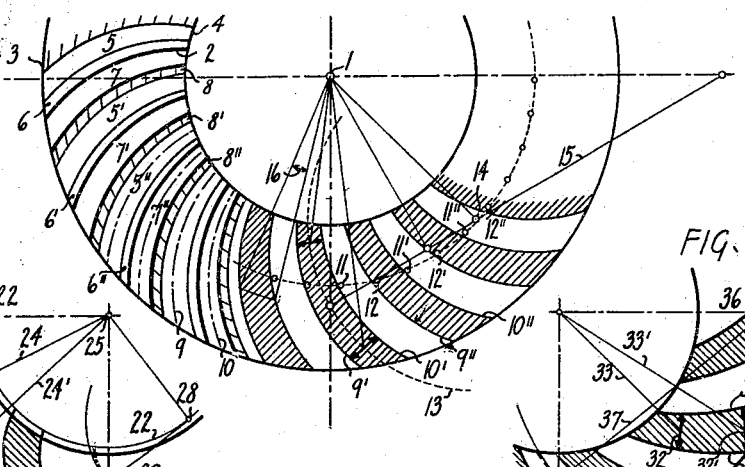

1,748,813

UNITED STATES PATENT OFFICE

ERNEST WILDHABER, OF NEW YORK, N. Y., ASSIGNOR TO GLEASON WORKS, OF ROCHESTER, NEW YORK, A CORPORATION OF NEW YORK

SPIRAL BEVEL GEAR

Application filed January 25, 1924. Serial No. 688,374.

My invention refers to bevel gears with longitudinally curved teeth, and particularly to bevel gears whose tooth surfaces are either surfaces of revolution, or more frequently such composite surfaces, as may be derived from a surface of revolution by a rolling-generating action. The methods referred to consist in providing a rotary cutting tool which longitudinally engages a tooth space of a blank.

Hitherto standard spiral bevel gears have been made by cutting tooth side after tooth side, one side only being cut at a time. Another known method permits cutting both sides of a tooth space on one gear of a pair simultaneously, while the other gear requires separate cuts for each side. This gain in the production is bought with a certain sacrifice on the tooth shape, the teeth of one gear being tapered only to a small extent, in longitudinal direction, while the required taper is carried mainly by the teeth of the other gear of said pair. In other words the teeth and the tooth spaces are differently tapered in such gears. The angular width of space varies with the distance from the apex.

One object of my invention is to provide a spiral bevel gear with substantially constant angular width of space, having such a tooth shape, that both sides of a tooth space can be simultaneously formed with a rotary cutting tool, said cutting tool having a longitudinally circular cutting face.

A further object is to provide a spiral bevel gear with teeth equally curved in longitudinal direction, the degree of curvature being such, that both sides of a tooth space of uniform angular width can be simultaneously cut or ground with a rotary cutting tool.

Another purpose of my invention is to provide a spiral bevel gear having a substantially constant angular width of space and an inclined tooth bottom of substantially constant actual width.

A still further purpose of the invention is to provide a pair of spiral bevel gears, in which both sides of a tooth space may be simultaneously cut or ground on either gear of said pair.

A further object is to provide methods for simultaneously forming both sides of a tooth space of a bevel gear of the character described.

A still further object of the invention is to provide gears having tooth surfaces derived from spherical surfaces.

The purposes of my invention are in short, increased production, and improved quality.

My invention will be explained with reference to the accompanying drawings, in which:

Fig. 1 is a plan view of a crown gear shown partly in section taken along its pitch plane, and showing teeth constructed according to my invention. Figs. 2 and 3 are sections along the pitch planes of other crown gears merely illustrated for explanatory purposes. Fig. 4 is an elevational view partly in section of the crown gear shown in Fig. 1. Fig. 5 is an elevational view of a partly cut blank and a section of a rotary cutter engaging two tooth sides of the blank, the teeth of said blank corresponding to the form of crown gear shown in Figs. 1 and 4. Fig. 6 is a front elevational view, partly in section, showing a gear, adapted to mesh with the pinion illustrated in Fig. 5, being ground. Fig. 7 is a plan view partly in section of a device for generating bevel gears according to my invention, the basic crown gear being of slightly modified form as compared with Fig. 1. Fig. 8 is a front elevational view, partly in section of the device shown in Fig. 7. Figures 9 to 12 are axial sections of rotary cutting tools, as may be used according to my invention. Fig. 13 is a development of the pitch cones of two gears of a pair, shown in engagement. Fig. 14 is a development of the pitch cones of a pair of gears of a modified form, as compared with Fig. 13. Fig. 15 is a plan view of a bevel gear constructed according to my invention. Figs. 16 and 17 are axial sections through face milling cutters such as might be employed in producing gears according to my invention; Fig. 18 is a plan view of the face mill shown in Fig. 16 looking in the direction of its axis; and Fig. 19 is a similar view of the face mill shown in Fig. 17.

It is customary to define and describe bevel gearing by characterizing the crown gear, that is a particular bevel gear of a system of bevel gears, whose pitch cone has a cone angle of 90° or nearly 90°. The pitch surface of a crown gear is, therefore, a plane, or nearly a plane.

Referring to Fig. 1, and particularly to the left part thereof the view shows a plan view, looking at right angles to the said pitch plane of a crown gear, and the right part of Fig. 1 is a sectional view taken through its pitch plane. 1 denotes the axis of the crown gear, the teeth 2 of which extend from the outside periphery 3 to the inside periphery 4. The toothed portion consists of the convex sides 5, 5', 5'' of the crown gear teeth, of the tips 6, 6', 6'', of the concave sides 7, 7', 7'' of the crown gear teeth, and of the tooth bottoms 8, 8', 8'', which are shown slightly shaded, to distinguish them from the tips. The pitch lines 9 and 10 are shown in dot and dash lines in the view on the left, and the pitch lines 9', 9'' and 10', 10'' are shown in full lines in the section on the right. The pitch lines shown in Fig. 1 are arcs of circles of centers 11, 11', 11'' and 12, 12', 12'', the center of a mean circle 13 being at 14, on normal line 15. The convex pitch lines 9 and the concave pitch lines 10 are parts of equal circles, which are angularly displaced about axis 1 from each other. In other words the angle, for which one side is displaced from the other side of a tooth, is the same at various distances from the apex 1. The angle, 16 in Fig. 1, will be referred to as the angular tooth thickness in the following, or angular width of space respectively. The crown gear shown in Fig. 1 has a constant angular tooth thickness and angular width of space.

Figs. 2 and 3 are shown for comparison to illustrate teeth, of constant angular thickness, which are differently curved in longitudinal direction. The pitch lines 20 and 21 of the crown gear shown in Fig. 2 are involutes, corresponding to a base circle 22. The (normal) tooth thickness 23 is therefore constant, and the same at various distances 24, 24' from apex 25, as well known to those skilled in the art. The required (normal) tooth thickness, namely, depends not only on the distance from the apex, but also on the inclination of the teeth, that is on their spiral angle. The involute being a curve of comparatively sharp curvature, the tooth inclination changes rapidly along the tooth, and makes up for the difference in apex distance, so that teeth of constant thickness result.

In a limited range the involute 26 can be approximated by circle 27, whose center 28 is situated on normal line 29, at the point of tangency of the normal line with base circle 22. Gears with such circular teeth approximate the qualities of gears provided with teeth extending along involutes longitudinally; that is their normal tooth thickness is substantially constant. This would make it possible to simultaneously cover and represent both sides of a crown gear tooth with a rotary cutting tool, whose axis is perpendicular to the pitch plane of the crown gear. In this way both sides of a tooth space of a blank can be simultaneously formed in a generating roll, but the resulting tooth shape is not so desirable. Such gears have a constant dedendum, and consequently a varying dedendum angle, which increases with decreasing apex distance.

The crown gear shown in Fig. 3 is provided with teeth of constant inclination with respect to the apex radius. The pitch lines 30 and 31 are logarithmic spirals, each spiral having the quality of including the same angle with every radius. The tooth thickness 32 is then proportional to the apex distance 33, in analogy to the conditions existing on straight teeth of bevel gears. The logarithmic spiral can be approximated by its curvature circle. Thus spiral 34 can be closely approximated by circle 35 whose center 36 is situated on normal line 37. It will be noted that circle 35 is much larger than circle 27 of Fig. 2.

When it is attempted to simultaneously cover both sides of a such a crown gear tooth with a rotary cutting tool, and to simultaneously form both sides of a tooth space of a blank, it will be found that the axis of said cutting tool must be inclined with respect to the pitch plane of the crown gear to such a degree, that the dedendum angle of the blank decreases rapidly at decreasing apex distance. While the dedendum should decrease about in proportion to the apex distance, it decreases nearly twice as fast at standard tooth proportions. This is also undesirable.

It will be noted however that here the dedendum angle of a blank decreases at decreasing apex distance, while in the case of Fig. 2 the dedendum angle increases at decreasing apex distance, when in either case both sides of a tooth space are simultaneously formed. Between the two cases there is necessarily a case, where the dedendum angle of a blank remains substantially constant, even when two tooth sides are simultaneously formed by a single rotary cutting tool. This case has been illustrated in Fig. 1. It is by far preferred over the embodiments of my invention shown in Figs. 2 and 3, and will be more fully described and explained in the following. The diameter of circle 13 is between the diameters of the circles 27 and 35, and its center 14 is located between their centers 28 and 36.

The crown gear teeth shown in Fig. 2 are not tapered longitudinally. The teeth shown in Fig. 3 are substantially tapered in longitudinal direction. In the intermediate case of Fig. 1 the teeth are only very moderately tapered, just so much as is provided by a rotary cutting tool, when so positioned as to produce the required dedendum angle.

Fig. 4 is a section and elevational view of the crown gear shown in Fig. 1, the right side being in axial section. The pitch plane of the crown gear is shown as line 40, which contains apex 41. A projection of the profile of the tip surface 6 of of the crown gear preferably passes through apex 41, as shown, thus constituting a constant addendum angle 42 at all distances from apex 41. The addendum angle of the crown gear corresponds to the dedendum angle of bevel gear blanks, which angle is substantially constant, according to the preferred embodiment of my invention.

Two slightly modified teeth 43 and 44 are shown in normal section in Figure 4 and Figure 4a tooth 43 being provided with straight normal profiles 43′ and 43″, while tooth 44 illustrates a slightly different form of tooth, which is provided with a convex profile 44′ and a concave profile 44″. Either shape, 43 or 44, may be adopted, but not both together. It is not necessary that the tooth profile be symmetrical with respect to the pitch plane. The convex tooth surface 44′ and the concave tooth surface 44″ should however be identical, in the case of theoretical gearing, which meshes with full line contact, and has a constant angular tooth thickness, as shown in Fig. 1. Surface 44′ might be for instance a convex spherical surface and 44″ a concave spherical surface of the same radius. In addition to being identical, the surfaces 44′ and 44″ should also be similarly disposed with respect to the pitch plane of the crown gear. In the case of spherical surfaces the centers of 44′ and 44″ should be the same distance below and above the pitch plane respectively, and at the same distance from apex 41.

Fig. 5, as an example, illustrates the spherical tooth surfaces of the crown gear, the latter being shown in axial section at the right. The plan view of this crown gear is similar to Fig. 1. Fig. 5 corresponds to a side elevational view taken from the right of Fig. 1. The convex tooth surfaces 5 (Fig. 1) of the crown gear are parts of convex spherical surfaces, whose centers 45, 45′, 45″ are situated at a distance 46 below pitch plane 40, (see Fig. 5). The centers 45 of the convex tooth surfaces describe a circle, which is shown in projection as a straight line 47 in Fig. 5. The concave tooth surfaces 6 (Fig. 1) of the crown gear are similarly concave spherical surfaces of the same radius. Their centers 48, 48′, 48″ are at the same distance 46 above pitch plane 40 (see Fig. 5), and describe another circle 49, which is symmetrically disposed to circle 47, with respect to pitch plane 40.

The pitch lines of the teeth of the crown gear are the intersection lines of the tooth surfaces with pitch plane 40, and are therefore identical circles 9′, 9″ and 10′, 10″ (Fig. 1). The intersection line of a spherical surface with a plane is namely always a circle, and spherical surfaces of the same radius will intersect a plane in equal circles, when such plane passes at the same distance 46 from their centers.

It will therefore be understood that theoretically accurate gears may be produced from a right hand gear and an exactly symmetrical left hand crown gear of the described type.

In order to produce a pair of mate gears one gear 56 is generated according to the method illustrated in Fig. 5 from a basic crown gear such as shown in that figure and the other gear 120 of said pair is generated from a basic crown gear 121 of opposite hand. The two crown gears are exact counterparts. When put together, so that the teeth of one gear go into the tooth spaces of the other crown gear and that their axes 1 and 122 coincide, their tooth spaces and teeth will exactly fit each other. When the crown gear shown in Fig. 5 has spherical side tooth surfaces, as is the preferred embodiment of my invention, the side tooth surfaces of the crown gear 121 will also be spherical. The convex tooth surfaces of the crown gear 121 are convex spherical surfaces of centers 123, while the concave tooth surfaces of this crown gear are concave spherical surfaces of centers 124. The centers 123 and 124 are located on two circles 125 and 126, which appear as straight lines in Fig. 6, which are at the same distances 46 from the pitch plane 127 as are the circles 47 and 49 from the pitch plane 40.

One tooth side or preferably both sides of a tooth space of the gear 120 may be produced in the same way by a rotary cutting tool, as has been explained with reference to the production of the pinion 56 by the cutting tool 51, that is, by positioning a cutting tool to cover and represent a tooth surface or adjacent tooth surfaces of the crown gear 121 and by providing a rolling motion, between the gear blank and the cutting tool employed, in the manner of a gear meshing with the crown gear 121. The cutting tool employed in cutting the gear 120 may be identical with the tool 51 used in cutting the pinion 56. In order to cut simultaneously two adjacent side tooth surfaces of the gear blank, the axis of the cutting tool should be so inclined as to pass through the center 123 of the convex side of the crown gear teeth as well as through the center 124 of the concave tooth side.

Instead of a milling cutter, I have shown in Fig. 6, a grinding wheel 130 such as might be employed for grinding the tooth surfaces of the gear 120 after the teeth have been cut or otherwise formed. The cutting surfaces or a cutting surface of the grinding wheel 130 will represent tooth surfaces or a tooth surface of the crown gear 121. Where two tooth surfaces of the gear 120 are to be ground simultaneously, the cutting surfaces of the grinding wheel 130 will represent two adjacent tooth surfaces of the crown gear 121. In the embodiment illustrated, the grinding wheel is of this form, the spherical cutting surface 131 representing a convex side tooth surface of the crown gear 121 and the spherical cutting surface 132 representing a concave side tooth surface of said crown gear. The axis 133 of the grinding wheel is so inclined as to pass through the centers 123 and 124 of the convex and concave side tooth surfaces of the crown gear. During the rotation of the grinding wheel about its axis 133, a relative rolling motion will be imparted between the wheel 130 and the gear 120 in the manner of a gear meshing with the crown gear 121. By the operation described, tooth surfaces will be ground upon the gear 120 which are conjugate with the tooth surfaces produced upon the pinion 56. The tooth surfaces of the pinion 56 may be ground by a grinding wheel identical with the wheel 130, the same relative motions being employed as described in connection with the cutting of the pinion by the tool 51.

In the following it will be explained how two tooth sides of either a right hand or a left hand bevel gear may be simultaneously formed. When both sides of a crown gear tooth shall be simultaneously represented and covered by a rotary cutting tool, the axis 50 of said cutting tool must be so inclined as to pass through the center 45 of the convex spherical tooth surface and also through center 48 of the concave spherical tooth surface. In other words axis 50 must be the connecting line between the said two centers, see Fig. 5. A milling cutter is shown in such position, in this figure, partly in elevation and partly in section. It consists of a body portion 51 and a number of inserted blades, which constitute an outside cutting surface 52, a cutting tip 53 and an inside cutting surface 54. The outside and the inside cutting surfaces, 52 and 54, respectively, are convex and concave spherical surfaces, respectively, having the same radius as the tooth surfaces to be represented, their centers coinciding with the centers 45 and 48 respectively, during the cut. When the cutter diameter has been suitably selected, a substantially constant dedendum angle 55 will be produced on a gear blank 56.

The tooth surfaces of gear 56 are produced by providing a rolling-generating motion between cutter and blank, while rotating the cutter about its axis. The generating motion represents a rolling action between the blank and the crown gear, of which the cutter constitutes a tooth, as familiar to those skilled in the art.

It will be noted, that it is thus possible to produce theoretically accurate bevel gears having a substantially constant dedendum angle, that is having a tooth bottom running towards the apex; and moreover that it is possible to form both sides of a tooth space simultaneously on such theoretically accurate gears.

Figures 7 and 8 show a slightly modified form of crown gear and illustrate a slightly modified way of generation. The cutter 60 represents and constitutes a tooth of a nominal crown gear 61, the pitch surface 62 of which is not exactly a plane, but a conical surface, having its cone angle 63 slightly smaller than 90°. It usually differs from a right angle by the dedendum angle 64 of the blank 65, see Fig. 7. The tip surface of this crown gear is a plane.

This form of crown gear is used by a well known machine, namely the Gleason spiral bevel gear generator. My invention provides a tooth shaped for this method of generation, so that in addition both sides of a tooth space of a blank can be simultaneously formed.

A crown gear used according to this embodiment of my invention and represented by a cutter 60 is shown in Fig. 8 in a view along its axis 66. The tip surfaces 67, 67', 67" of this crown gear are of constant width. They are shown slightly shaded for convenience. In the case illustrated in Fig. 7 the apex 68 is outside of the tip circle 69 of the cutter, and situated in the plane of the tip.

In this method of generation just described the axis 70 of the rotary cutting tool 60 is set parallel to the axis 66 of the generating crown gear, whereas in Fig. 5 the axis of the cutting tool is inclined with respect to the axis 1 of the crown gear. The method of generation shown in Figs. 7 and 8 is closely approximate, whereas the method corresponding to Fig. 5, may be theoretically accurate, as stated. The cutter diameter required for simultaneous forming of two tooth surfaces may in either case be determined by the known methods of descriptive geometry. When all other data are the same, the cutter diameter will be found to be very nearly the same for either form of crown gear. The principle is to curve the teeth longitudinally to such an extent, that the resulting teeth and tooth spaces are only moderately tapered in longitudinal direction, just so much as will be provided by a rotary cutting tool, when positioned so as to produce the required dedendum angle.

Apart from the selection of the cutter diameter and the determination of the cutter setting, the generation can entirely be kept along the known lines.

In order to carry out this purpose a milling cutter 60 is rotatably fixed to a cradle 71, which contains V-shaped circular projections 72, which may slide along stationary guidances 73 of the frame 74 of the machine. The guidances permit the cradle to be angularly fed about axis 66, which is parallel to the cutter axis 70 and passes through the apex 68 of blank 65, after the latter has been set in position.

A gear blank 65 is rotatably held in stationary bearings 75 which are so positioned, that the axis 76 of the blank intersects axis 66 in apex 68. While the cutter is rotated, the blank 65 and the cradle 71 perform a generating roll, which consists in an angular feed of the cradle about axis 66 and in a corresponding angular turning motion of the blank about its own axis 76.

The mate gear may be cut upon the same machine in the same way. To produce mathematically accurate tooth surfaces, however, the basic crown gears must be exact counterparts of one another. In this case, the pitch surface of the crown gear upon which the mate gear is rolled should be larger than 90° by the same angle that the counterpart crown gear is less than 90°. Correct gears can be produced as long as the two basic crown gears are exactly complementary and the sum of their pitch angles is equal to 180°.

The profile of the cutting tool to be used according to my invention can be varied within broad limits. Fig. 9 shows a milling cutter with straight cutting profiles 80 and 81, which, as a rule, are inclined in a slightly different degree against the cutter axis 82, in correspondence with present practice. The milling cutter of Fig. 10 has an outer convex profile 83 and an inner concave profile 84. These profiles are substantially arcs of circles, having centers 85 and 86 and radii 87 and 88. Fig. 11 illustrates a milling cutter with concave outward profile 89 and concave inward profile 90. Such a cutter may be used for simultaneously cutting both sides of a tooth space without the generating roll. In gear pairs of large reduction, such as are used in the rear axle drives of motor cars, the larger gear of the pair may be advantageously cut with a formed cutter, Fig. 11, the tool and the blank being approached toward each other until full cutting depth is reached. Fig. 12 shows a rotary cutting tool in the form of a grinding wheel, having an outwardly convex profile 91 and an inwardly concave profile 92. Both profiles thereof are shown as arcs of circles, having centers 93 and 94 and radii 95 and 96. All forms of rotary cutting tools to be used according to my invention can be embodied either as milling cutters or as grinding wheels.

Fig. 13 is a development of the pitch cones of a pair of gears made in accordance with my invention, and especially according to the way illustrated in Fig. 7 and Fig. 8. The developments have a common center or apex at 100. The shaded areas 101, 102, 103 are the sections of the pitch cone of one gear with its teeth, 101', 102' being the pitch line of the convex tooth sides and 101'', 102'', 103'', being the pitch lines of the concave tooth sides. The areas 104, 105, 106 are the tooth sections of the pitch cone of the other gear of said pair, 104', 105' and 104'', 105'' being the convex and concave pitch lines, respectively.

It will be noted that the areas do not entirely fit each other. The convex pitch lines 104', 105' are somewhat more curved than the concave pitch lines 102'', 103'', as shown in exaggeration in Fig. 13. The tooth bearing has, therefore, a tendency to be concentrated in the middle of the teeth. This is an asset as long as it is not exaggerated, inasmuch as it allows for slight inaccuracies in the mounting of the gears. When this tendency of concentrating the tooth bearing however becomes too pronounced, as is the case for big pitches and small tooth numbers of the corresponding crown gears, it is preferable to provide a correction, such correction being made possible by using a different cutter on the two gears of a pair. Gears corresponding to Fig. 13 are produced when using the same cutter on both gears of a pair.

When using two cutters, gears can be produced, the driving sides of which may fit each other as closely as desired. The unimportant reverse sides of the teeth will then alone have concentrated tooth bearing. The two cutters used for this purpose are of slightly different diameter, the outside diameter of one cutter corresponding to the inside diameter of the other cutter.

Fig. 14 is a development of the pitch cones of a pair of gears made after the manner just described, and having the areas 109 and 107, 110 and 108 entirely fit each other, while the contact between the areas 106 and 109, 107 and 110, 108 and 111 is concentrated in their mid-portion. In either case, shown in Fig. 13 and Fig. 14 respectively, both sides of a tooth space can be simultaneously formed according to my invention.

The gears of a pair formed according to my invention may be provided with equal or unequal addenda in the same way as that of other spiral bevel gears. Unequal addenda are frequently recommended for large reductions, the pinion being provided with an increased addendum.

The terms, angular width of space and angular tooth thickness, apply always to the middle of the tooth height, unless differently specified. In the case of equal addenda on both gears of a pair the said terms refer consequently to the pitch surface. In the case of a pair of gears with unequal addenda, the angular width of space and the angular tooth thickness are measured somewhat outside of the pitch surface, namely midway between the outside cone and the bottom cone.

Fig. 15 illustrates a gear made according to my invention, in a view taken at right angles to the bottom 112 of a tooth space. It can be considered as a gear formed in a generating roll, or also as a gear cut with a formed milling cutter without generating motion. The tooth bottoms are of equal width 113 along their whole length, and are preferably cut towards the apex. In other words the tooth bottom is situated substantially on a conical surface, the projection of which has the same apex 114 as that of the pitch cone of the gear, thereby providing a constant dedendum angle. The two sides 115 and 116 of a tooth space are parts of coaxial surfaces of revolution, if the gear is produced with a formed cutter without generating roll. The axis of said two surfaces of revolution is shown at 117. When the tooth sides 115 and 116 are produced in a generating process, they constitute surfaces derived from two coaxial surfaces of revolution.

Fig. 16 shows a type of milling cutter 135 such as may be used for producing gears according to this invention. The cutter 135 is provided with an outside cutting face 136 of convex profile, a cutting tip 137, and an inside cutting face 138 of concave profile. Inserted blades 139 are suitably fastened to the body 140 of the cutter. The blades 139 are relieved back of their cutting edges in a direction parallel to the cutter axis 141. 142 denotes a cutting profile such as would result after the cutter has been sharpened a number of times. The profile 142 is identical in form to the profile 136—137—138 and is merely displaced in an axial direction with reference to this latter profile.

Fig. 17 illustrates a milling cutter which is provided with a somewhat different kind of relief. The inclination of the convex outside profile 145 with respect to the cutter axis 146 is substantially different from the inclination of the concave inside profile 147. In such cases, the relief provided extends in a direction somewhat oblique to the cutter axis 146 as indicated by arrow 148. A profile such as would be formed after sharpening is shown in dotted lines at 149. This profile is displaced not only in an axial direction but inwardly also.

A partial view in the direction of the cutter axis of the tool 135 is shown in Fig. 18, while Fig. 19 shows a corresponding view of the tool shown in Fig. 17. The relief lines 150 extend inwardly, while the relief lines 151 remain at a constant distance from the cutter axis 141.

It will be understood that such changes and modifications may be made in my invention, as fall within the scope of the appended claims.

I claim:

1. A pair of spiral bevel gears, either gear of said pair having tooth spaces whose sides and bottoms are conjugate to, but different from, coaxial surfaces of revolution, said surfaces being of such diameter, that the sum of the dedendum angles of said pair is substantially the same on the large end and on the small end of the teeth.

2. A pair of spiral bevel gears, either gear of said pair having tooth spaces whose sides and bottoms are conjugate to, but different from, coaxial surfaces of revolution, said sides being conjugate to surfaces of revolution of curved profile, and the tooth bottoms of said pair being in line with its apex.

3. A pair of spiral bevel gears, either gear of said pair having tooth spaces whose sides and bottoms are conjugate to coaxial surfaces of revolution, said surfaces being rotatable about an axis inclined to their own axis and different from the axis of either member of said pair, and the tooth bottoms of said pair being in line with its apex.

4. A pair of spiral bevel gears, each gear of said pair having tooth spaces whose sides and bottoms are conjugate to, but different from, coaxial surfaces of revolution, said sides being conjugate to convex and concave spherical surfaces respectively, and the sum of the dedendum angles of said pair being substantially the same on the large end and on the small end of the teeth.

5. A pair of spiral bevel gears, each gear of said pair having tooth spaces whose sides and bottoms are conjugate to, but different from, coaxial surfaces of revolution, said sides being conjugate respectively to a convex and a concave spherical surface of substantially equal radii, the tooth bottoms of said pair being in line with their respective apexes.

6. A pair of spiral bevel gears, each gear of said pair having tooth spaces whose sides and bottom are conjugate to coaxial surfaces of revolution, said surfaces being rotatable about an axis inclined to their own axis and different from the axis of either member of said pair, said surfaces containing curved profiles and being of such diameter, that the sum of the dedendum angles of said pair is substantially on the large end and on the small end of the teeth.

7. A pair of longitudinally curved tooth tapered gears, each of which has sides conjugate to, but different from, surfaces of revolution, alternate side surfaces being conjugate respectively to convex and concave spherical surfaces, each gear having generated tooth surfaces conjugate to the tooth surfaces of a basic gear other than its mate.

8. A pair of longitudinally curved tooth tapered gears, each of which has tooth spaces whose sides are conjugate to, but different from, coaxial surfaces of revolution, said sides being conjugate respectively to convex and concave spherical surfaces of substantially equal radii, each gear having generated tooth surfaces conjugate to the tooth surfaces of a basic gear other than its mate.

9. A pair of longitudinally curved tooth tapered gears, which have side tooth surfaces conjugate to the side tooth surfaces of complementary basic gears, adjacent side tooth surfaces of each basic gear being, respectively, coaxial convex and concave spherical surfaces of revolution.

In testimony whereof I affix my signature.

ERNEST WILDHABER.